US008627421B1

(12) United States Patent
Bowers et al.

(10) Patent No.: US 8,627,421 B1
(45) Date of Patent: Jan. 7, 2014

(54) METHODS AND APPARATUS FOR AUTHENTICATING A USER BASED ON IMPLICIT USER MEMORY

(75) Inventors: Kevin Bowers, Melrose, MA (US); Tamara S. Denning, Seattle, WA (US); Ari Juels, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 103 days.

(21) Appl. No.: 13/249,980

(22) Filed: Sep. 30, 2011

(51) Int. Cl.
*H04L 9/32* (2006.01)

(52) U.S. Cl.
USPC ............................................................ 726/5

(58) Field of Classification Search
USPC ............................................................ 726/5
See application file for complete search history.

(56) References Cited

U.S. PATENT DOCUMENTS

| | | | | |
|---|---|---|---|---|
| 2004/0093527 | A1* | 5/2004 | Pering et al. | 713/202 |
| 2007/0124595 | A1* | 5/2007 | Carter et al. | 713/182 |
| 2007/0283416 | A1* | 12/2007 | Renaud | 726/2 |
| 2009/0288150 | A1* | 11/2009 | Toomim et al. | 726/5 |

OTHER PUBLICATIONS

Denning et al., "Exploring Implicit Memory for Painless Password Recovery", May 2011, ACM, pp. 2615-2318.*

Gibson et al., "Musipass: Authenticating Me Softly with "My" Song", Sep. 2009, ACM, pp. 85-100.*
Renaud et al., "Pictures or Questions? Examining User Responses to Association-Based Authentication", 2010, ACM, pp. 98-107.*
Hayashi et al., "Use Your Illusion: Secure Authentication Usable Anywhere", Jul. 2008, Symposium on Usable Privacy and Security (SOUPS), pp. 1-11.*
Schacter et al., Implicit Memory: A Selective Review, Annual Review of Neuroscience, 16:159-82 (1993).
Cave, Very Long-Lasting Priming in Picture Naming, Psychological Science, 8:322-5 (1997).
Mitchell, Nonconscious Priming After 17 Years: Invulnerable Implicit Memory?, Psychological Science, 17:925-9 (Nov. 2006).

* cited by examiner

*Primary Examiner* — Matthew Smithers
(74) *Attorney, Agent, or Firm* — Ryan, Mason & Lewis, LLP

(57) ABSTRACT

Methods and apparatus are provided for authenticating a user based on implicit user memory. Access to a protected resource is controlled by presenting a user with a plurality of stimuli during a priming phase; presenting the user with a plurality of degraded versions of the primed stimuli and with a plurality of degraded versions of non-primed stimuli during an authentication phase; receiving an identification from the user of the degraded versions of the primed stimuli and the degraded versions of the non-primed stimuli; and authenticating the user based upon a number of correct identifications of the degraded versions of the primed stimuli. The stimuli can comprise, for example, images and/or sounds. An authentication score can be based, for example, on a number of correctly labeled primed stimuli plus a number of incorrectly labeled non-primed stimuli.

27 Claims, 4 Drawing Sheets

METHODS AND APPARATUS FOR AUTHENTICATING A USER BASED ON IMPLICIT USER MEMORY

FIELD OF THE INVENTION

The present invention relates generally to security techniques for authenticating users over a network or in other types of communication systems.

BACKGROUND OF THE INVENTION

In order to gain access to applications or other resources via a computer or another device, users are often required to authenticate themselves by entering authentication information, such as a password. Explicit memory forms the basis of most existing knowledge-based authentication systems. Typically, existing knowledge-based authentication systems require the user to explicitly recall a secret, such as a password or a personal identification number (PIN). Most alternative systems, such as graphical password systems and preference-based authentication systems, require users to enroll by committing a secret to memory or presenting some personal secret, and then the user is authenticated by recalling or recognizing the previously enrolled secret. All of these systems are explicit in the sense that the user is consciously attempting to recall or recognize the authentication secret.

Authentication schemes based upon explicit memory suffer from a tension between security and usability. This weakness leads to forgotten passwords (particularly for web sites that are infrequently visited) or to familiar breaches of security, such as writing passwords down, using information that is easily guessed or remembered, or reusing passwords for multiple web sites. Increasing the length or randomness of secrets further increases the cognitive burden on the user. Life-history and preference questions avoid some of these pitfalls, but can be subject to low entropy (i.e., a small answer space), multiple possible answers, data-mining, or changing over time.

Implicit memory, on the other hand, unconsciously influences or controls people's actions even when they are not attempting to retrieve the memory in question. Motor skills are one notable type of implicit memory. Habituated physical actions, such as riding a bike, do not require explicit mental effort. Cognitive studies have shown that explicit and implicit memories have different biological mechanisms. Patients with brain damage that causes poor performance on explicit memory tests may still perform well on motor and other implicit memory tasks. See, for example, D. L. Schacter et al., "Implicit Memory: A Selective Review," Annual Review of Neuroscience, 16:159-82 (1993), incorporated by reference herein.

One particular kind of implicit memory, referred to as priming, involves exposing a user to a particular set of stimuli in order to observe its effects in later testing. In short-term priming, a user unconsciously completes open-ended tasks with a bias towards recently viewed stimuli. Certain priming effects, however, have been shown to persist for weeks, months, and even years. See, for example, C. B. Cave, "Very Long-Lasting Priming in Picture Naming," Psychological Science, 8:322-5 (1997); or D. B. Mitchell, "Nonconscious Priming After 17 Years: Invulnerable Implicit Memory?," Psychological Science, 17:925-9 (November 2006), each incorporated by reference herein.

A need exists for improved user authentication systems based on implicit user memory, such as priming.

SUMMARY OF THE INVENTION

The present invention in the illustrative embodiments described herein provides methods and apparatus for authenticating a user based on implicit user memory. According to one aspect of the invention, access to a protected resource is controlled by presenting a user with a plurality of stimuli during a priming phase; presenting the user with a plurality of degraded versions of the primed stimuli and with a plurality of degraded versions of non-primed stimuli during an authentication phase; receiving an identification from the user of the degraded versions of the primed stimuli and the degraded versions of the non-primed stimuli; and authenticating the user based upon a number of correct identifications of the degraded versions of the primed stimuli. The stimuli can comprise, for example, images and/or sounds. The priming phase optionally records an identifier of each primed stimuli presented to the user, as well as a label provided by the user for each primed stimuli and a date on which the primed stimuli was presented.

An authentication score can be based, for example, on a number of correctly labeled primed stimuli plus a number of incorrectly labeled non-primed stimuli. The authentication score optionally assigns a weight to the number of correctly labeled primed stimuli and to the number of incorrectly labeled non-primed stimuli. In a further variation, individual stimuli can be assigned a weight based on how well the corresponding stimuli distinguishes between users that were primed on the corresponding stimuli and users that were not primed on the corresponding stimuli. In yet another variation, the authentication score assigns a weight to the number of correctly labeled primed stimuli and to the number of incorrectly labeled non-primed stimuli based on a response time. Alternatively, the authentication phase might incorporate other non-labeling identification tasks.

The disclosed authentication method can be used, for example, as part of a password recovery method. The authentication techniques of the illustrative embodiments overcome one or more of the problems associated with the conventional techniques described previously, and permit users to authenticate themselves using implicit user memory. Moreover, no modification of the applications or communication protocols is required. These and other features and advantages of the present invention will become more readily apparent from the accompanying drawings and the following detailed description.

DETAILED DESCRIPTION

The present invention provides methods and apparatus for user authentication based on implicit user memory. According to one aspect of the invention, the above-described priming effect is employed for user authentication. In this manner, an authentication mechanism is provided that is based on a user's implicit memory of past experiences. According to another aspect of the invention, an authentication mechanism is provided that evaluates a user's implicit familiarity with information by evaluating a user's ability to respond more quickly to primed information, relative to unfamiliar information that has not been primed. The present invention recognizes that a user can be influenced to interpret incomplete stimuli with a bias towards his or her implicit memories. In this manner, an authentication system is provided that is based upon a user's implicit memory of images or other stimuli, and does not require the user to remember explicit facts.

While the exemplary embodiment leverages a user's visual memory by priming the user with images, priming and implicit memory authentication can also be employed using other modalities, such as verbal, motor, and aural stimuli, as would be apparent to a person of ordinary skill in the art.

According to one aspect of the invention, when a user undergoes the registration process, the user is assigned a set of stimuli which is presented to the user in a priming process. When the user subsequently needs to authenticate, the user is tested on fragmented or degraded versions of a combination of primed and non-primed stimuli. As discussed hereinafter, statistical differences in correctness and optionally timing between responses to primed and non-primed stimuli in the set can be used to decide whether or not an authenticating user is the same user who completed the registration process. In this system, the stimuli composing the priming set is the effective password. Since the primed stimuli are implicitly remembered, however, it does not cause the same cognitive burden on the user as explicitly remembered passwords. The primed stimuli are also resilient to adversarial attack, even given knowledge of the system's image database.

Figure 1:
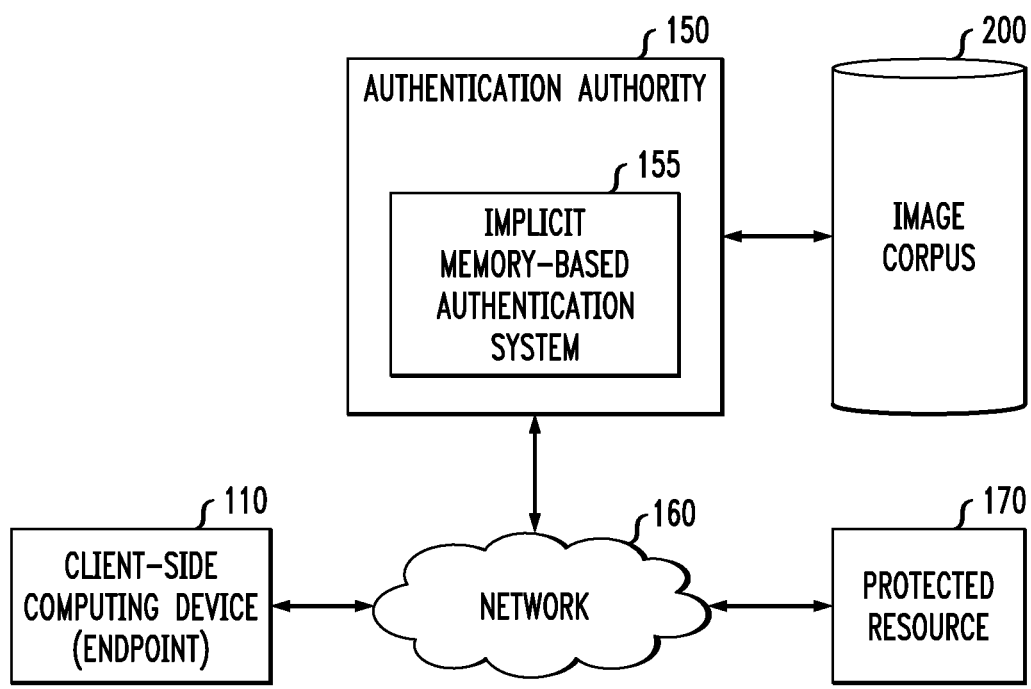
FIG. 1 illustrates an exemplary network environment in which the present invention can operate.

FIG. 1 illustrates an exemplary client-side computing device (CSCD) 110 communicating with a protected resource 170 over a network 160. In an exemplary implementation, the user must authenticate with an authentication authority 150 before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

It is to be appreciated that a given embodiment of the disclosed system may include multiple instances of CSCD 110, authentication authority 150 and protected resource 170, and possibly other system components, although only single instances of such components are shown in the simplified system diagram of FIG. 1 for clarity of illustration.

As used herein, the term "session" with a protected resource 170 shall mean an interactive information interchange between a CSCD 110 and the protected resource 170.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The CSCD 110 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other protected resources 170, and verifies the authentication information that is presented by a CSCD 110. Thus, in the exemplary embodiment, the protected resource 170 delegates the authentication process to the authentication authority 150. Upon requesting access to the protected resource 170, the CSCD 110 can be redirected to the authentication authority 150 until the authentication information is verified. In a further variation, the protected resource 170 can directly request authentication information from the CSCD 110 without delegating to the authentication authority 150.

As shown in FIG. 1, the authentication authority 150 comprises an implicit memory-based authentication system 155 that incorporates aspects of the present invention. As discussed further below in conjunction with FIGS. 3 and 4, respectively, the exemplary implicit memory-based authentication system 155 provides an implicit memory priming process 300 and an implicit memory authentication process 400. In addition, the exemplary implicit memory-based authentication system 155 employs an image corpus 200, as discussed further below in conjunction with FIG. 2, that comprises a pair-wise database of visual stimuli, such as complete images, and their corresponding fragmented or degraded versions.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Figure 2:
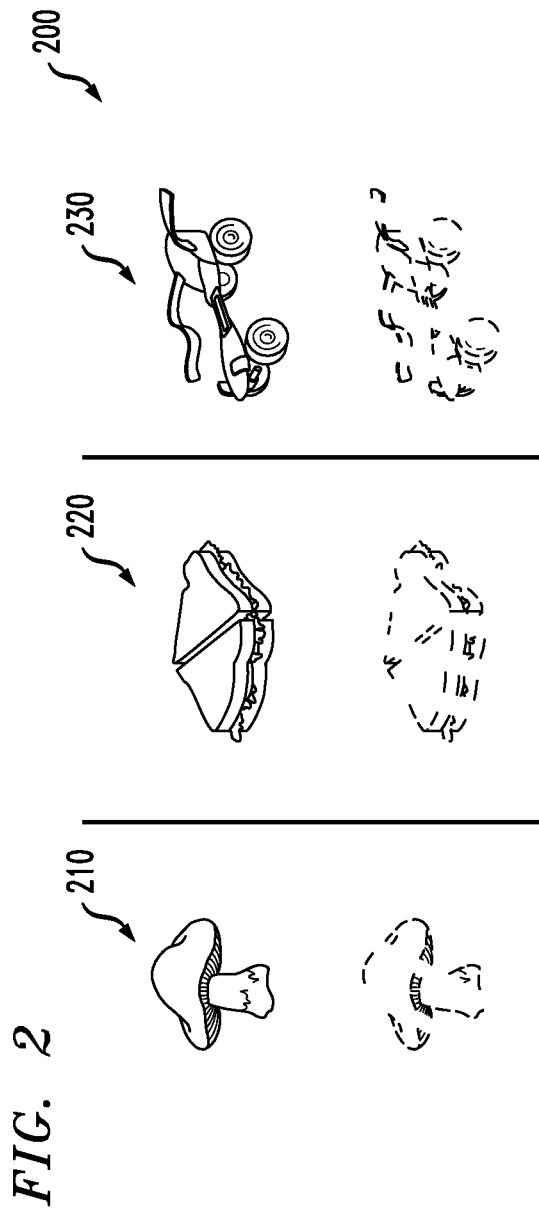
FIG. 2 illustrates an exemplary image corpus of FIG. 1 incorporating features of the present invention.

As previously indicated, the exemplary implicit memory-based authentication system 155 employs an image corpus 200, shown in FIG. 2, that comprises a pair-wise database of visual stimuli, such as complete images, and their corresponding fragmented or degraded versions. As discussed further below in conjunction with FIG. 3, a random subset of images from the image corpus 200 are presented to the user during the priming process 300. The exemplary pair-wise visual stimuli shown in FIG. 2 comprise line drawings of a mushroom 210, a sandwich 220, and a roller skate 230.

Generally, the image corpus 200 should comprise a sufficient supply of complete and degraded image pairs that provide sufficient differentiation between primed and non-primed users. The exemplary image corpus 200 is an extension of images from the Snodgrass and Vanderwart Picture Set. See, e.g., J. G. Snodgrass and J. Corwin, "Perceptual Identification Thresholds for 150 Fragmented Pictures from the Snodgrass and Vanderwart Picture Set," Perceptual and Motor Skills, 67:3-36 (1988) or J. G. Snodgrass and M. Vanderwart. "A Standardized Set of 260 Pictures: Norms for Name Agreement, Image Agreement, Familiarity, and Visual Complexity," J. of Experimental Psychology: Human Learning and Memory, 6:174-215 (1980), each incorporated by reference herein.

As discussed further below in conjunction with FIG. 3, the exemplary priming process 300 prompts the user for a label for each image that is presented to the user during the priming process, to help familiarize the user with the image. Thus, as shown in FIG. 2, for each user, the image corpus 200 preferably comprises a record 250 comprising an identifier 260 of the corresponding user, an identifier 270 of each image in the primed set, as well as the corresponding image label 280 provided by the user during the priming process, and the date 290 on which the user was primed with the image. Alternatively, a different non-labeling task could be given to the user to familiarize the user with the priming stimuli, as discussed further below.

Priming Phase

As previously indicated, priming involves exposing a user to particular stimuli, such as images or sounds (or other sensory stimuli), in order to later test the user's implicit memory on these stimuli. In one exemplary implementation, a user is primed with a set of line drawings of common objects from the image corpus 200 of FIG. 2. The user is subsequently exposed to a set of fragmented line drawings, during an authentication phase, discussed further below in conjunction with FIG. 4, where portions of the drawings have been erased or otherwise altered, thereby rendering the identity of the object more difficult to discern. When the fragmented images are presented in their degraded form, it is difficult for a user to identify the content of the image. Prior exposure to a complete image during priming makes identification of the counterpart degraded image easier.

During the authentication phase, the user is challenged with a set of images comprised of both fragments of images on which the user has been primed and fragments of images on which the user has not been primed. It can be shown that the user is able to identify and label the fragments of primed images more successfully and more quickly than the fragments of non-primed images. It has been shown that the user is able to identify and name the fragments of primed images even weeks or months later, and one study shows that the effect can endure long after the participants retained a conscious memory of the study.

Figure 3:
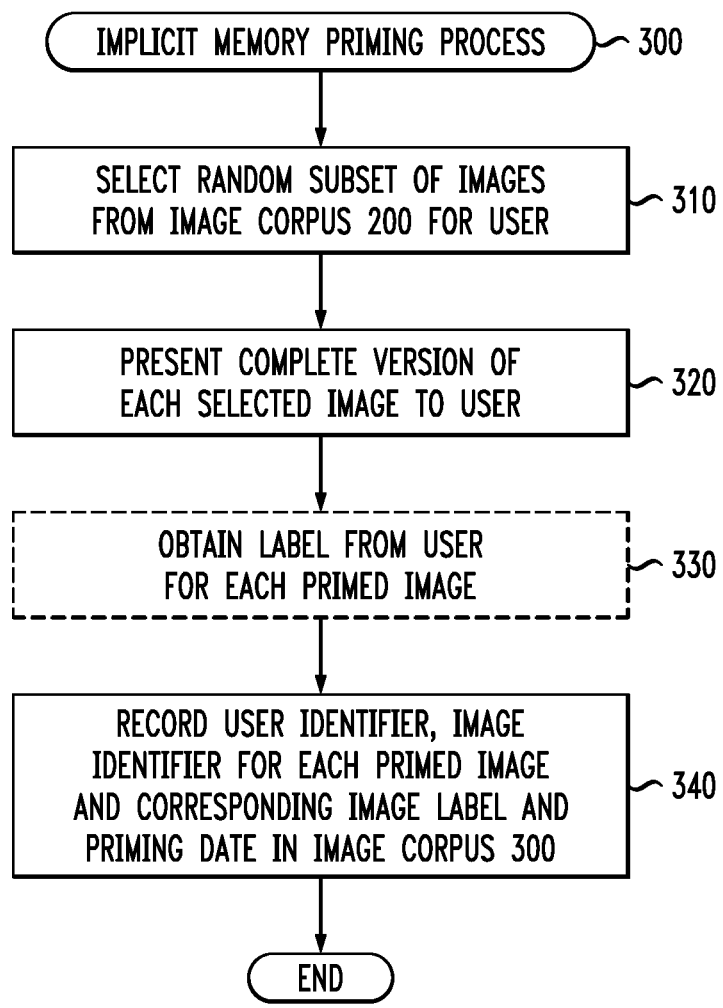
FIG. 3 is a flow chart of an exemplary implicit memory priming process incorporating aspects of the present invention.

FIG. 3 is a flow chart of an exemplary implicit memory priming process 300 incorporating aspects of the present invention. As shown in FIG. 3, the exemplary implicit memory priming process 300 initially selects a random subset of images from the image corpus 200 of FIG. 2 for this user during step 310. Thereafter, the user is presented during step 320 with a complete version of each selected image.

The exemplary implicit memory priming process 300 obtains a label from the user during step 330 for each primed image to help ensure that the user focuses on the primed images. For example, the obtained label may comprise one or more words that best describe the object. Finally, the implicit memory priming process 300 records an identifier of the user in the image corpus 200 during step 340, as well as an identifier of each primed image and the corresponding image label and priming date.

Authentication Phase

As previously indicated, during a challenge phase, the user is exposed to a set of fragmented images where portions of the image are removed or altered, thereby rendering the identity of one or more objects in the image more difficult to discern. The set of fragmented images is composed of both fragments of images on which the user has been primed and fragments of drawings that the user has not been primed.

Figure 4:
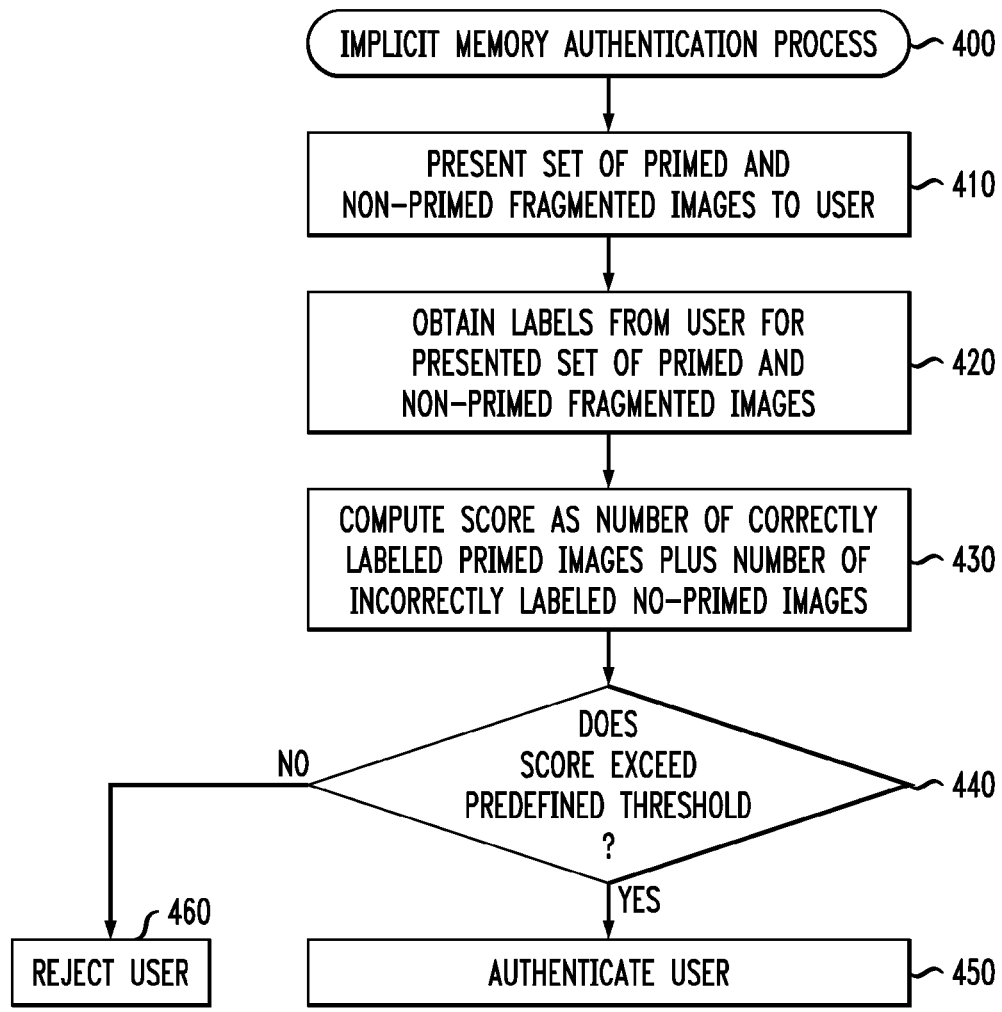
FIG. 4 is a flow chart of an exemplary implicit memory authentication process incorporating aspects of the present invention.

FIG. 4 is a flow chart of an exemplary implicit memory authentication process 400 incorporating aspects of the present invention. As shown in FIG. 4, the exemplary implicit memory authentication process 400 initially presents a subset of primed and random non-primed fragmented images to the user during step 410. In one preferred embodiment, the implicit memory authentication process 400 presents a primed stimulus only once to a user in an authentication prompt. Thereafter, different primed stimuli must be used, to ensure that the user is not potentially contaminated by previously viewed image fragments. During step 420, the implicit memory authentication process 400 prompts the user for a label for each presented primed and non-primed image fragment. In a variation, the authentication prompts the user to mark which fragmented images can be visualized as completed objects. In another variation, the authentication process prompts the user to answer a question based upon the identity of the object in the fragmented image (e.g., "Which of these objects would be found in the ocean?" or "Where is this object most likely to be found? A) The bedroom; B) The bathroom; C) The kitchen; or D) The garage). In another variation, the authentication process might prompt the user to use an input device to complete the line drawing.

The authentication score is computed during step 430 as the number of correctly labeled primed images plus the number of incorrectly labeled (or skipped) non-primed images. For example, the authentication score can test whether the number of correct responses to primed images plus the number of incorrect responses to non-primed images total 75% or more of all responses.

The exemplary authentication score thus indicates the degree to which the identification of images aligns with the priming that the user received. Thus, in the exemplary embodiment, a user's score is not simply the number of degraded images that are correctly labeled, but rather, a user is scored on how well the labeling success aligns with the primed image set. Thus, in the exemplary embodiment, the user is penalized for correctly labeling non-primed images and rewarded for incorrectly labeling non-primed images. The score components can optionally be weighted to prioritize the number of correctly labeled primed images over the number of incorrectly labeled (or skipped) non-primed images (or vice versa). Alternatively, individual images can be assigned a weight based on how well the corresponding image distinguishes between users that were primed on the corresponding image and users that were not primed on the corresponding image.

In a further variation, the weighting can also adjust the authentication score based on the amount of time it takes the user to respond to the prompt, such as the time it takes for the user to press the first key of the response. The weights could also be based on a closeness of the label that the user provides during authentication to the label that the user provided during priming. For example, a given image can have a number of correct labels, for example, when there are a number of synonymous labels or when there are cultural or geographic variations to the labels that users provide to a given image. A higher weight can be assigned when the user provides the same label during authentication that the user provided during priming when there are multiple correct labels. In yet another variation, when a user is presented with multiple images at once, a weight can be assigned to each image based on the likelihood that the user is looking at a given image when the label is provided (as obtained, for example, from an eye-tracking apparatus). In this manner, statistical differences in correctness and timing between responses to primed and non-primed stimuli can be used to decide whether or not an authenticating user is the same user who completed the registration process.

A test is performed during step 440, to determine if the computed authentication score exceeds a predefined threshold. If it is determined during step 440 that the computed authentication score exceeds a predefined threshold, then the user is authenticated during step 450. If, however, it is determined during step 440 that the computed authentication score does not exceed a predefined threshold, then the user is rejected during step 450.

The strength of the implicit memory authentication process 400 can be assessed based on the entropy associated with each primed image. The exemplary embodiment of FIG. 4 provides one bit of entropy per primed image based on whether the user answers as expected (i.e., a correct label when primed or an incorrect label when unprimed). The strength of the authentication can be increased, for example, using additional images. In one variation, multiple complete images are created that map to the same fragmented image. For example, all complete images can be partitioned into groups of 16 images, and for each group, the 16 different complete images are mapped to one unique fragmented image. Priming each user on one random complete image within each group will give 4 bits (log 16) of entropy per primed image. The label provided by the user provides additional information on the image from the image group that was used to prime the user.

In addition, the security parameters of this system (false negative, false positive, size of password space) can be calculated and arbitrarily set by adjusting acceptance thresholds, the number of stimuli assigned to the user in the priming process, and the number of fragmented stimuli presented to the user at authentication, as would be apparent to a person of ordinary skill in the art.

Figure 5:
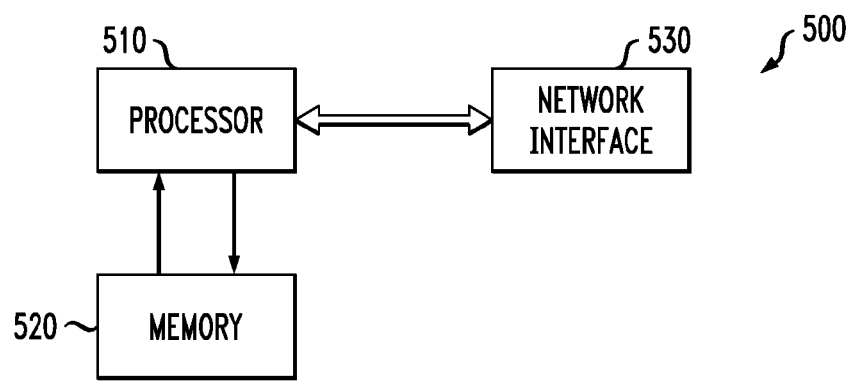
FIG. 5 illustrates one possible implementation of a given client-side computing device, authentication authority, protected resource or another processing device of the exemplary network environment of FIG. 1.

FIG. 5 shows one possible implementation of a given processing device 500 of the FIG. 1 system. The processing device 400 as shown may be viewed as representing, for example, CSCD 110, authentication authority 150 and protected resource 170. The processing device 500 in this implementation includes a processor 510 coupled to a memory 520 and a network interface 530. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 520 and executed by the corresponding processor 510. The memory 520 is also used for storing information used to perform computations or other operations associated with the disclosed authentication techniques.

The present invention recognizes that the above-described priming effect can be employed for non-conscious, low-effort authentication. The present invention is particularly well suited for use in a password-recovery system. The present invention applies an implicit-memory approach to authentication. Among other benefits, the retention of implicit secrets is potentially very long-lasting. In addition, registration and authentication by the users does not require memorization. The implicit secrets can be random and have precisely quantifiable entropy. Furthermore, with the disclosed approach, enrollment stimuli are distinctly different from authentication stimuli, thereby avoiding image set intersection attacks.

As previously indicated, the above-described embodiments of the invention are presented by way of illustrative example only. Numerous variations and other alternative embodiments may be used. For example, in the exemplary embodiment, the protected resource 170 delegates the authentication process to the authentication authority 150. Thus, upon requesting access to the protected resource 170, the CSCD 110 is redirected to the authentication authority 150 until the authentication information is verified. In a further variation, the protected resource 170 can directly request authentication information from the CSCD 110 without delegating to the authentication authority 150.

For example, as noted above, while the exemplary embodiment provides authentication based on a user's visual memory by priming the user with images, other modalities can alternatively be employed, such as verbal, motor, and aural stimuli, as would be apparent to a person of ordinary skill in the art.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to other types of authentication information.

The illustrative embodiments of the invention as described herein provide an improved authentication of users of password-based authentication systems. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of credentials or authentication information, and other types of access-controlled resources. Also, the particular configuration of system elements shown in FIGS. 1 and 5, and their interactions as shown in FIGS. 3 and 4, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for controlling access to a protected resource, the method comprising the steps of:

presenting a user with a plurality of primed stimuli during a priming phase;

presenting said user with a plurality of degraded versions of a subset of said primed stimuli and with a plurality of degraded versions of non-primed stimuli during an authentication phase;

receiving an identification from said user of said degraded versions of said primed stimuli and said degraded versions of said non-primed stimuli; and authenticating said user based upon a number of correct identifications of said degraded versions of said primed stimuli.

2. The method of claim 1, wherein said authenticating step is further based upon a number of incorrect identifications of said degraded versions of said non-primed stimuli.

3. The method of claim 1, wherein said plurality of stimuli comprise one or more of images and sounds.

4. The method of claim 1, wherein said priming phase further comprises the step of recording an identifier of each primed stimuli presented to said user.

5. The method of claim 4, wherein said priming phase further comprises the step of recording for each primed stimuli one or more of a label provided by the user and a date on which the primed stimuli was presented.

6. The method of claim 1, wherein said received identification comprises one or more answers to one or more questions about said primed stimuli.

7. The method of claim 1, wherein said received identification comprises a completion of said degraded version of said primed stimuli.

8. The method of claim 1, wherein said protected resource comprises one or more of an application, web site or hardware device.

9. The method of claim 1, wherein said authenticating step further comprises the step of computing an authentication score based on a number of correctly labeled primed stimuli plus a number of incorrectly labeled non-primed stimuli.

10. The method of claim 9, wherein said authentication score assigns a weight to the number of correctly labeled primed stimuli and to the number of incorrectly labeled non-primed stimuli.

11. The method of claim 9, wherein said authentication score assigns a weight to the number of correctly labeled primed stimuli and to the number of incorrectly labeled non-primed stimuli based on a response time.

12. The method of claim 9, wherein said authentication score assigns a weight to each stimuli based on how well the corresponding stimuli distinguishes between users that were primed on the corresponding stimuli and users that were not primed on the corresponding stimuli.

13. The method of claim 9, wherein said authentication score assigns a weight to each stimuli based on a likelihood that the user is processing a given stimuli when the identification is provided.

14. The method of claim 1, wherein said method comprises a password recovery method.

15. The method of claim 1, wherein a plurality of different primed stimuli map to the same degraded version of said primed stimuli and wherein said authenticating step is based on whether said user correctly identifies a given one of said different primed stimuli that was presented to said user during said priming phase.

16. The method of claim 1, wherein said primed stimuli are randomly selected from a larger corpus.

17. A tangible machine-readable recordable storage memory for controlling access to a protected resource, wherein the one or more software programs when executed by one or more hardware devices implement the steps of the method of claim 1.

18. An apparatus for controlling access to a protected resource, the apparatus comprising:

a memory; and at least one hardware device, coupled to the memory, operative to implement the following steps:

present a user with a plurality of primed stimuli during a priming phase;

present said user with a plurality of degraded versions of a subset of said primed stimuli and with a plurality of degraded versions of non-primed stimuli during an authentication phase;

receive an identification from said user of said degraded versions of said primed stimuli and said degraded versions of said non-primed stimuli; and authenticate said user based upon a number of correct identifications of said degraded versions of said primed stimuli.

19. The apparatus of claim 18, wherein said authentication is further based upon a number of incorrect identifications of said degraded versions of said non-primed stimuli.

20. The apparatus of claim 18, wherein said plurality of stimuli comprise one or more of images and sounds.

21. The apparatus of claim 18, wherein said priming phase further comprises recording an identifier of each primed stimuli presented to said user.

22. The apparatus of claim 21, wherein said priming phase further comprises recording for each primed stimuli one or more of a label provided by the user and a date on which the primed stimuli was presented.

23. The apparatus of claim 18, wherein said protected resource comprises one or more of an application, web site or hardware device.

24. The apparatus of claim 18, wherein said authenticating step further comprises the step of computing an authentication score based on a number of correctly labeled primed stimuli plus a number of incorrectly labeled non-primed stimuli.

25. The apparatus of claim 18, wherein said authenticating step further comprises the step of computing an authentication score based on a response time for the number of correctly labeled primed stimuli and for the number of incorrectly labeled non-primed stimuli.

26. The apparatus of claim 18, wherein said apparatus comprises a password recovery apparatus.

27. The apparatus of claim 18, wherein said primed stimuli are randomly selected from a larger corpus.

* * * * *